INVENTOR.
James F. McCarroll
BY
ATTORNEYS.

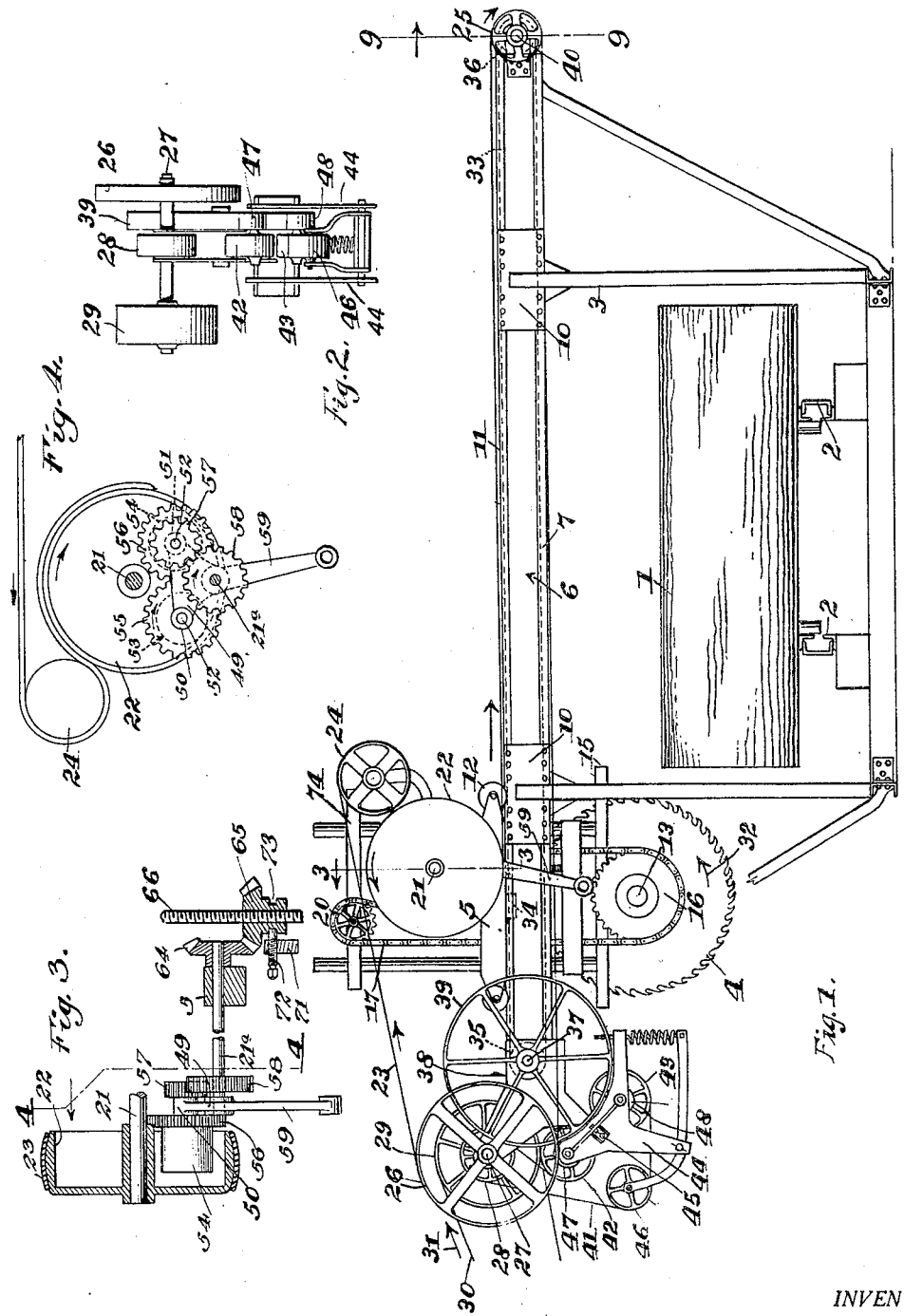

May 16, 1933.  J. F. McCARROLL  1,908,713
SAWMILL
Filed Oct. 28, 1930  3 Sheets-Sheet 3
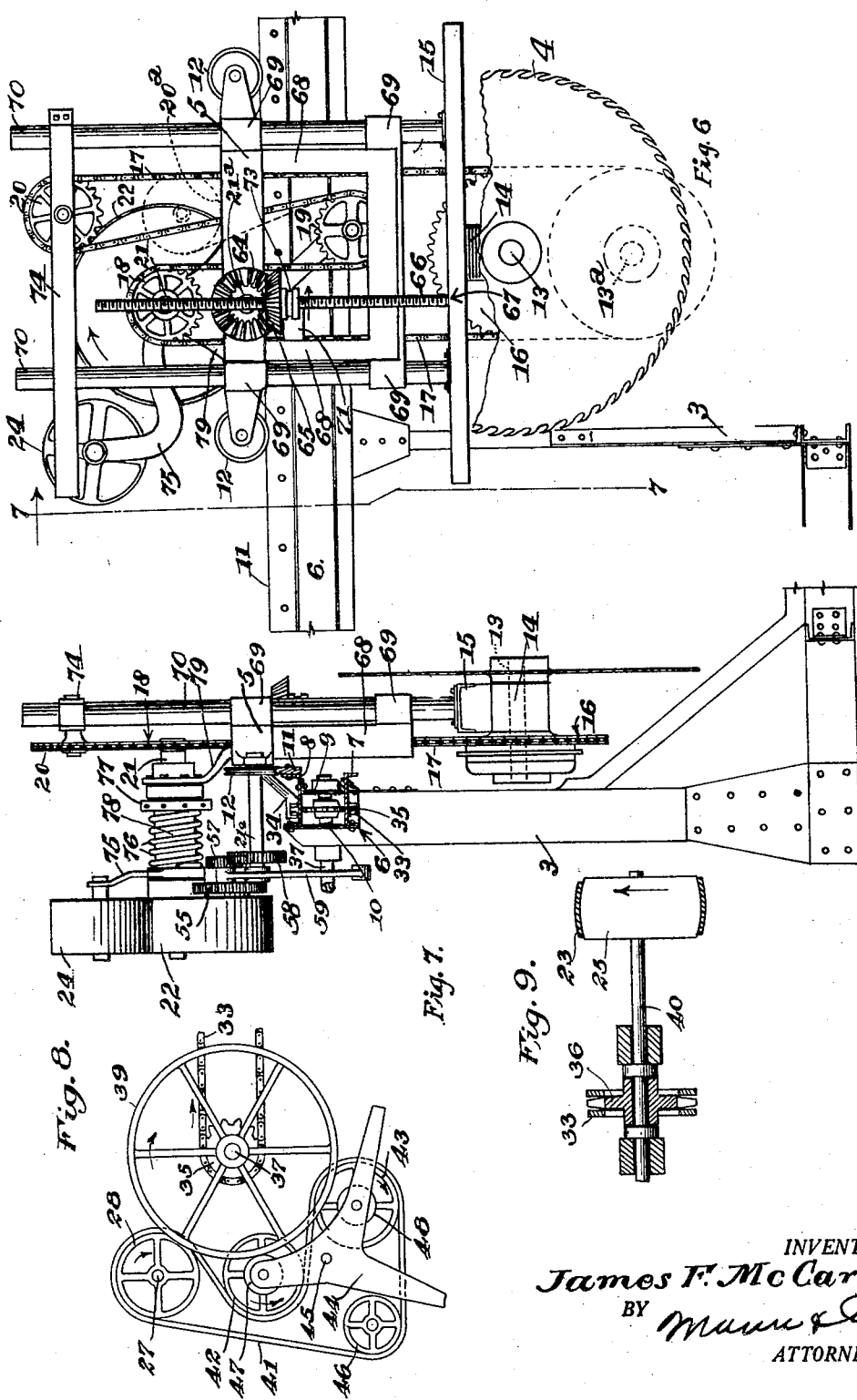
INVENTOR.
James F. McCarroll.
BY
ATTORNEYS.

Patented May 16, 1933

1,908,713

UNITED STATES PATENT OFFICE

JAMES F. McCARROLL, OF BATON ROUGE, LOUISIANA

SAWMILL

Application filed October 28, 1930. Serial No. 491,787.

This invention relates to improvements in saw mills, and it consists of the constructions, combinations and arrangements herein described and claimed.

An object of the invention is to provide a saw mill with an overhead traveling saw carriage which embodies a provision for lowering and raising the saw, these functions being made to occur upon reversal of the direction of the carriage as it reaches the limits of its travel toward the ends of the frame.

Another object of the invention is to enable the use of a much smaller saw on large logs than is now possible with prevailing arrangements of saw mills, this advantage occurring by virtue of the vertically movable mounting of the saw.

Other objects and advantages will appear in the following specification, reference being had to the accompanying drawings in which Figure 1 is an elevation of one side of the improved saw mill.

Figure 2 is an end elevation of the driving and reversing mechanism.

Figure 3 is a section taken substantially on the line 3—3 of Figure 1.

Figure 4 is a vertical section taken on the line 4—4 of Figure 3.

Figure 6 is a somewhat enlarged elevation of the saw carriage and its associated parts, a portion of the saw being broken away.

Figure 7 is a section taken substantially on the line 7—7 of Figure 6.

Figure 8 is a diagram of the carriage actuating means.

Figure 9 is a cross section taken on the line 9—9 of Figure 1.

Figure 5:
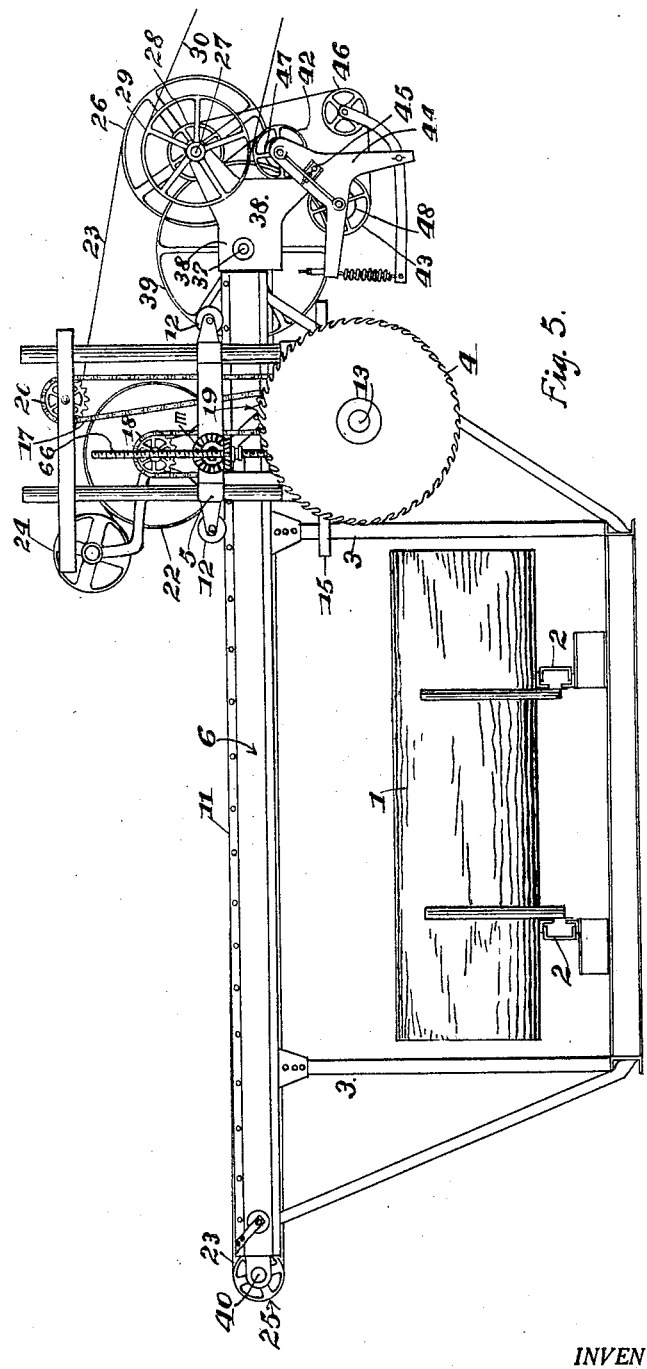
Figure 5 is an elevation of the other side of the saw mill.

As already briefly indicated, the purpose of this invention is to enable the utilization of relatively small circular saws in cutting large logs into boards, this facility being an especially attribute of the overhead carriage and the vertical adjustment of the saw in reference thereto. In prevailing types of saw mills where the arbor is fixedly mounted in the approximate plane of the husk it becomes necessary to use exceptionally large saw blades on large logs if even a moderate number of boards is to be cut before having to turn the log over.

With a given size of saw, say 40″, mounted on a fixed arbor in the approximate plane of the saw mill husk it will be impossible to take off so much as a single slab from the side of a 32″ log. On the other hand, the same saw mounted on the vertically adjustable arbor herein contemplated will repeatedly cut through the side of the same log until a board 17″ wide is made.

The novelty is divided between the foregoing vertical adjustment of the saw and certain incidental structure that occurs both in the saw carriage and the frame. A log 1 is supported at 2 in any appropriate manner in reference to a frame generally denoted 3, so that the saw 4 can cut boards from one side as the overhead carriage 5 is made to travel back and forth.

An elongated head 6 surmounts the frame 3. This comprises a hollow construction (Fig. 7) by virtue of the rivetting together of an assemblage of channel irons 7, 8 and 9 and several back plates 10 (Fig. 1). This structural arrangement gives the head 6 the necessary cross sectional size without making it unduly heavy. A rail 11 is secured to one of the flanges of the top channel 8, and it is on this rail that the grooved wheels 12 of the carriage 5 roll.

The manner in which the saw 4 is revolved is as follows:—Its arbor 13 is appropriately journaled in an extension 14 of a channel iron sill 15 (Figs. 6 and 7). This arbor carries a sprocket 16 to which a chain 17 is applied in common with sprockets 18, 19 and 20 (Fig. 6). The sprocket 18 is carried by one end of a shaft 21 (Fig. 7) which carries a pulley 22 at its opposite end (Fig. 1).

A belt 23 is applied to this pulley as well as idlers 24, 25 and a driver pulley 26. The driver is mounted on a main shaft 27 (Figs. 1 and 2) in common with pulleys 28 and 29. The latter is belted at 30 to a source of power which is always applied in the direction of arrow 31. It is easy to understand that turning of the shaft 27 in the clockwise direction will cause a counter clockwise turning of the shaft 21 and arbor 13 so that the saw 4 is revolved in the direction of arrow 32 in readiness to cut into the log 1.

The manner in which the carriage 5 is moved back and forth along the head 6 and the saw 4 presented to the log 1 is as follows:—An endless chain 33 (Figs. 1 and 7) has a connection at 34 with the carriage 5. The bights of the endless chain 33 are trained over sprockets 35, 36 at the approximate extremities of the head 6. The sprocket 35 is carried by a shaft 37 that is journaled on a carrier 38 (Fig. 5) stationary on the head 6, which shaft also carries a friction wheel 39.

There is a loose mounting of the sprocket 36 on the shaft 40 (Fig. 9) that carries the idler pulley 25, this loose mounting being necessary because the idler 25 always revolves in the clockwise direction while the pulley 36 must revolve counter-clockwise to suit the reversal of the carriage 5 for movement toward the left end of the head 6. For accomplishing the right and left or forward and backward movements of the carriage 5 along the head 6 the pulley 28 is belted at 41 to a pair of pulleys 42, 43 that are mounted on a rocker 44 that is pivotally carried at 45 by an extension of the carrier 38. The belt 41 also passes over an idler 46 which has a resilient mounting to maintain the tension of the belt.

The respective pulleys 42, 43 have friction wheels 47, 48, either of which is adapted to engage the large friction wheel 39. Assume the shaft 27 to be revolving clockwise (Fig. 8). By tracing the direction of the belt 41 it will be found that the wheel 47 is revolving counter-clockwise while the wheel 48 is revolving clockwise. If the rocker 44 is given a slight shift to the right (Fig. 8) on its pivot 45, the wheel 47 will be engaged with the wheel 39 while the wheel 48 will run free. The result is a clockwise turning of the wheel 39 and shaft 37 and a movement of the carriage 5 to the right so as to present the saw 4 to the log 1.

When the limit of travel toward the right has been reached the rocker 44 will be shifted to the left (Fig. 8) on its pivot 45, thus engaging the wheel 48 with the wheel 39 and disengaging the friction wheel 47. The result is a counter-clockwise turning of the wheel 39 and shaft 37 and a movement of the carriage 5 toward the left. The shifting of the rocker 44 is accomplished by hand either by direct contact or through any ordinary linkage extending to the working position of the sawyer.

The manner in which the saw 4 is lowered preparatory to making the cut in the forward travel and is raised from the log preparatory to making the backward travel is as follows:—A rocker frame 49 (Figs. 3 and 4) is rockably mounted on the shaft 21ª and provides journals 50, 51 (Fig. 4) for the shafts 52 of a pair of friction wheels 53, 54. One of these at a time is adapted to contact the inside periphery of the pulley 22 whence motion is imparted to the shaft 21ª either in one or the other direction.

For this purpose the shafts of the respective friction wheels 53, 54 carry perpetually meshing gears 55, 56 (Fig. 4). One of the shafts also carries a pinion 57 meshing with a gear 58 to which driving power is imparted, all of said gears and the pinion constituting a gear train by which motion of the pulley 22 is imparted to the driven shaft 21ª. Any suitable means may be employed for rocking the frame 49, a simple arrangement comprising an arm 59 depending from the frame 49 (Fig. 4) and capable of being swung by any known means either into positions of engagement of the respective friction wheels 53, 54 with the pulley 22 or into a neutral non-contacting position.

Under the present adjustment (Fig. 4) the friction wheel 53 is held in contact with the pulley 22. The resulting clockwise motion of the shaft 21ª will revolve meshing gears 64, 65 (Fig. 6) respectively fixed on the shaft 21 and provided with a screw hub threaded on a screw stem 66, so that the latter will be lowered.

This screw stem has a fixed connection at 67 (Fig. 6) with the channel iron 15. Since the latter supports the arbor 13, it follows that the saw 4 will be lowered to the desired depth respecting the log 1. When this position is reached the frame 49 (Fig. 4) will be swung to neutral so that neither friction wheel 53, 54 contacts, whereupon the rocker 44 may be swung as already indicated (Fig. 8) so that the carriage 5 may be transported to the right (Fig. 1). Desiring to return the carriage after the cut the sawyer will first elevate the saw 4 by a reversal of the frame 49 (Fig. 4) until the friction wheel 54 contacts the pulley 22, whereupon he next reverses the rocker 44.

A depending portion 68 (Fig. 6) of the carriage 5 includes guide means 69 in which bars 70 of the channel iron 15 are slidably guided. These bars insure steady down and up motions of the channel iron when lowering and raising the saw 4. It is upon the carriage 5 that the shaft 21ª has bearing (Fig. 3). The necessity for a swivel mounting of the gear 65 is answered by providing the depending portion 68 with a boss 71 (Figs. 3 and 6), which carries a screw 72 (Fig. 3) permanently occupying a position in a groove 73 in the hub of the gear 65.

A cross member 74 (Fig. 6) is suitably affixed to the upper ends of the bars 70 and provides a support for the sprocket 20 which is the only relatively movable one of the set 18, 19, 20. Assuming the arbor to have been lowered to the position 13ª (Fig. 6) the sprocket 20 will be lowered a corresponding distance to the position 20ª. In other words the sprocket 20 follows the saw so that the chain 17 may always maintain a given tension with neither binding nor relaxation at any given position of the saw.

An arm 75, under tension of a spring 76 (Fig. 7), supports the idler 24 in proper relationship to the pulley 22. The tension of the spring 76 may be regulated by a device 77 (Fig. 7) which is mounted on a sleeve 78 in which the shaft 21 revolves. The sleeve is supported by a bracket 79 upon the carriage 5.

*The operation* has already been described in such detail that nothing more than a brief review is thought necessary. To lower and raise the saw 4 the sawyer shifts the arm 59 (Fig. 1) either to the left or right. Upon shifting it to the left the frame 49 is rocked to the right so as to bring the friction wheel 53 in contact with the inner periphery of the pulley 22 whereupon the shaft 21ª turns the gear 65 counter-clockwise (looking down Fig. 6) and causes a lowering of the screw stem 66 hence of the saw 4. A reversal of the lever 59 causes a reversal of the saw so that the latter is raised. The friction wheels 53, 54 (Fig. 4) can be neutralized by moving the arm 59 into a central position.

To cause the carriage 5 (Fig. 1), hence the saw 4 and all of its carried parts to travel to the right the sawyer will shift the rocker 44 to the right (Fig. 8) so that motion is transmitted to the friction wheel 39 by way of the friction wheel 47. A return of the carriage 5 is brought about by shifting the rocker 44 to the left.

The belt 30 is never reversed, that is to say the upper strand always travels in the direction of arrow 31 (Fig. 1). Consequently the shaft 27 always revolves in the clockwise direction (Fig. 1). The uniform travel of the belt 41 is converted into reciprocation of the carriage 5 by shifting the rocker 44 as already brought out.

While the construction and arrangement of the improved saw mill is that of a generally preferred form, obviously modifications and changes may be made without departing from the spirit of the invention or the scope of the claims.

I claim:—

1. In a saw mill, a saw and an arbor by which the saw is carried, means in which the arbor is journaled for revolution, a sill by which said means is carried, a pair of guide bars attached to the sill and extending therefrom in parallelism, a carriage and a portion depending therefrom, both the carriage and said portion having means for receiving said bars, a driven shaft journaled on the carriage and having a drive gear, a screw stem carried by the sill and extending therefrom in parallelism to said bars, a driven gear meshing with the drive gear and having a screw hub receiving said stem, and means for swivelly supporting the driven gear upon said depending portion.

2. In a saw mill, a saw and an arbor by which the saw is carried, means in which the arbor is journaled for revolution, a sill by which said means is carried, a guide bar secured to the sill, a carriage and means embodied in the carriage for receiving said bar, a driven shaft journaled on the carriage and having a drive gear, a screw stem secured to the sill, a driven gear meshing with the drive gear and having a screw hub receiving said stem, and means for swivelly supporting the driven gear upon said carriage.

JAMES F. McCARROLL.